US012613146B2

(12) United States Patent
Jiao et al.

(10) Patent No.: US 12,613,146 B2
(45) Date of Patent: Apr. 28, 2026

(54) STRUCTURAL TEMPERATURE SELF-MONITORING SYSTEM BASED ON CHIRAL STRUCTURED SHAPE MEMORY POLYMER

(71) Applicant: ZHEJIANG UNIVERSITY, Hangzhou (CN)

(72) Inventors: Pengcheng Jiao, Hangzhou (CN); Jiajun Wang, Hangzhou (CN); Lingwei Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 391 days.

(21) Appl. No.: 18/486,150

(22) Filed: Oct. 12, 2023

(65) Prior Publication Data

US 2024/0094062 A1 Mar. 21, 2024

Related U.S. Application Data

(63) Continuation of application No. PCT/CN2022/078513, filed on Mar. 1, 2022.

(30) Foreign Application Priority Data

Apr. 13, 2021 (CN) .......................... 202110397182.0

(51) Int. Cl.
*G01K 11/00* (2006.01)

(52) U.S. Cl.
CPC .................................... *G01K 11/00* (2013.01)

(58) Field of Classification Search
CPC .......... G01K 11/00; G01K 5/483; G01K 5/58; G01K 2211/00; G01K 7/00
See application file for complete search history.

(56) References Cited

U.S. PATENT DOCUMENTS

2010/0218716 A1 9/2010 Havens et al.

FOREIGN PATENT DOCUMENTS

| CN | 106602684 A | 4/2017 |
| CN | 109510509 A | 3/2019 |

(Continued)

OTHER PUBLICATIONS

International Search Report (PCT/CN2022/078513); Date of Mailing: May 30, 2022.

*Primary Examiner* — Christopher M Koehler
*Assistant Examiner* — Ethan Nguyen Vo
(74) *Attorney, Agent, or Firm* — Wiersch Law Group

(57) ABSTRACT

A structural temperature self-monitoring system based on a chiral structured shape memory polymer microporous plate, comprising a fixing apparatus, a chiral structured microporous plate, and a triboelectric nanogenerators set. Each chiral element of microporous plate is provided with a hexagonal cell and six chiral legs, and the microporous plate may occur specific deformation under certain conditions. The microporous plate is fixed on the fixed apparatus, and the triboelectric nanogenerators set comprises two lateral sliding mode triboelectric nanogenerators that are symmetrically distributed; the data of deformation of chiral structured microporous plate in converse directions is collected; and a voltage is emerged for measurement. The system can monitor the temperature of any portion of structure without an external power supply, and obtain the temperature data possessing both timeliness and accuracy under the condition of ensuring the integrity and representativeness of temperature data.

6 Claims, 1 Drawing Sheet

(56)     References Cited

FOREIGN PATENT DOCUMENTS

| | | | |
|---|---|---|---|
| CN | 110823408 | A | 2/2020 |
| CN | 111551269 | A | 8/2020 |
| CN | 111786590 | A | 10/2020 |
| CN | 112129349 | A | 12/2020 |
| CN | 113091943 | A | 7/2021 |
| KR | 101645134 | B1 | 8/2016 |

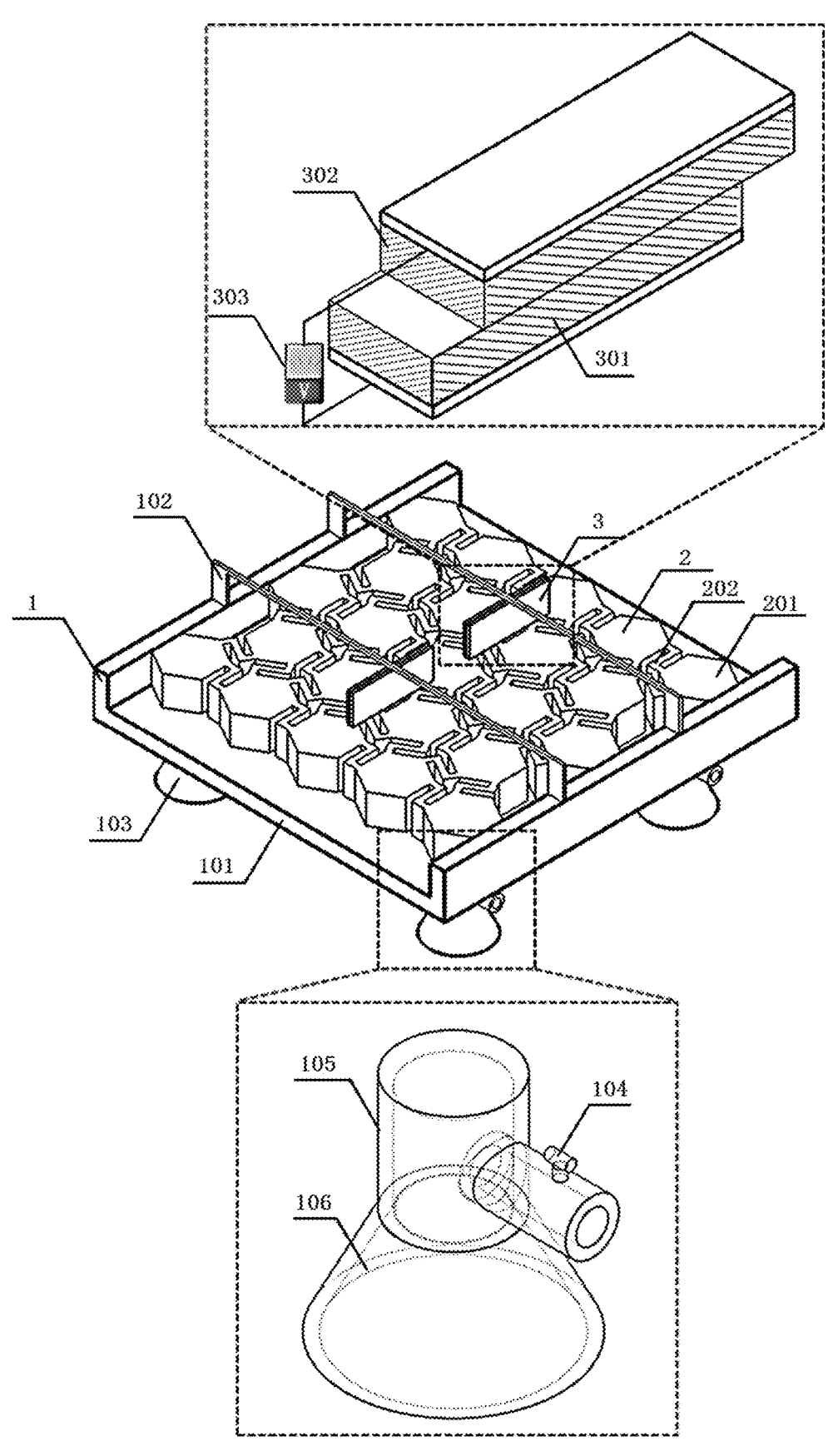

STRUCTURAL TEMPERATURE SELF-MONITORING SYSTEM BASED ON CHIRAL STRUCTURED SHAPE MEMORY POLYMER

CROSS-REFERENCE TO RELATED APPLICATIONS

The present application is a continuation of International Application No. PCT/CN2022/078513, filed on Mar. 1, 2022, which claims priority to Chinese Application No. 202110397182.0, filed on Apr. 13, 2021, the contents of both of which are incorporated herein by reference in their entireties.

TECHNICAL FIELD

The present disclosure relates to the technical field of structural health monitoring and in particular, to a structural temperature self-monitoring system combined with temperature-responsive effect and triboelectric effect of a chiral structured shape memory polymer microporous plate with negative Poisson's ratio.

BACKGROUND

Structural temperature monitoring is an important part of structural health monitoring. Structural deformation mainly includes two aspects: thermotropic normal deformation caused by a temperature change and abnormal deformation caused by structural damage or material degradation. The thermotropic normal deformation accounts for most of the total structural deformation, which may disguise the abnormal deformation that really has a negative impact on the structural health. Therefore, it is necessary to monitor the structural temperature. The existing structural temperature monitoring technologies mainly include structural temperature monitoring based on an infrared thermal imager and structural temperature monitoring based on an embedded temperature sensor. However, the infrared thermal imager may only monitor the surface temperature of structure, and the energy transmission of embedded temperature sensor is blocked due to a structure cavity, and thus the structural temperature measured by two methods lacks accuracy and timeliness. Therefore, it is necessary to design an accurate and efficient structural temperature monitoring system.

The development of triboelectric nanogenerators provide technical support for the present disclosure. The triboelectric nanogenerators are new electrostatic generators based on triboelectric effect and Maxwell displacement current principle. The nanogenerators include two dielectric films with materials of opposite poles facing each other. There are four working modes of triboelectric nanogenerators in different structures: contact-separation mode, lateral sliding mode, single-electrode mode and friction-independent mode. The surface electrostatic charge generated during the physical contact and separation of two insulators may be used to generate electric power. The potential drip is generated by separating the friction pair from the contact induced friction charge to oblige the electronics flow between the two electrodes. The triboelectric nanogenerators are less limited by environmental or climatic conditions, and have higher power output and energy conversion efficiency than the electromagnetic and piezoelectric energy collector in the application of mechanical energy collection. At present, the triboelectric nanogenerators have been applied to collecting energy such as wind energy, water, structural vibration and biomechanical motion, and also applied to self-powered intelligent sensors, such as vector sensors, tactile sensors, vibration detection and human physical signal detection.

In the present disclosure, the lack of accuracy, representativeness and timeliness of data obtained by the traditional temperature monitoring technologies is considered. The present disclosure provides a structural temperature self-monitoring system combined with temperature-responsive effect and triboelectric effect of a chiral structured shape memory polymer microporous plate with negative Poisson's ratio. The effects of present disclosure are as follows: the system may monitor the temperature of any portion (surface or interior) of structure without an external power supply, and obtain temperature data with timeliness and accuracy while ensuring the integrity and representativeness of temperature data, thereby realizing the accurate and efficient self-monitoring of structural temperature. The innovation of present disclosure lies in the environment adaptation of system, self-powered characteristic, conversion of mechanical energy to storable electrical energy through structural innovation, deformation-temperature theoretical model, and realization of real-time temperature measurement at different portions of structure.

SUMMARY

In view of the lack of accuracy, representativeness and timeliness of temperature data measured by the traditional structural temperature monitoring technologies, the present disclosure provides a structural temperature self-monitoring system combined with temperature-responsive effect and triboelectric effect of a chiral structured shape memory polymer microporous plate with negative Poisson's ratio.

The purpose of present disclosure is realized by the following technical solution: a structural temperature self-monitoring system based on a chiral structured shape memory polymer, including a fixing apparatus, a chiral structured microporous plate and a triboelectric nanogenerators set.

Each chiral element of chiral structured microporous plate is provided with one hexagonal cell and six chiral legs. Adjacent chiral elements are connected to each other through the chiral legs. The deformation of chiral structured microporous plate occurs during a temperature change.

The chiral structured microporous plate is fixed at the fixing apparatus, and the triboelectric nanogenerators set includes two slidable triboelectric nanogenerators symmetrically distributed to collect the deformation data of chiral structured microporous plate in converse directions. One electronic of nanogenerators is fixed at a bracket of fixing apparatus, and the other electronic of nanogenerators is fixed at and moves with the chiral structured microporous plate. Both electronics move relative to each other to emerge a voltage for measurement during the temperature change.

In an embodiment, the fixing apparatus is provided with a tray, two brackets and four vacuum suckers. Each vacuum sucker is provided with an air value, a vent cylinder and a soft sucker.

The soft sucker is located at the lower part of vacuum sucker capable of being sucked at a monitored structure part after being vacuumed. The vent cylinder is located above the soft sucker and is configured to connect the soft sucker to the air valve. The air valve is located at the right side of vent cylinder as a control switch of port for air.

In an embodiment, two ends of chiral structured microporous plate with a certain thickness are fixed at the tray. The deformation only includes contraction or expansion in the unfixed direction during the temperature change.

In an embodiment, the triboelectric nanogenerators work in lateral sliding mode, and the lateral deformation of chiral structured microporous plate includes the elongation or shortening of chiral legs.

In an embodiment, the first electrode of triboelectric nanogenerators is fixed at the bracket, and the second electrode is fixed at the chiral structured microporous plate. The second electrode moves with the chiral structured microporous plate and slides relative to the first electrode fixed during the temperature change to emerge a voltage measured by a voltage measuring device.

In an embodiment, the chiral structured microporous plate has the properties of negative Poisson's ratio of a chiral structure, and shape memory effect of a shape memory polymer material.

The beneficial effects of present disclosure are as follows: in view of the lack of accuracy, representativeness and timeliness of data obtained by the traditional temperature monitoring technologies, a structural temperature self-monitoring system combined with temperature-responsive effect and triboelectric effect of a shape memory polymer microporous plate with chiral structure with negative Poisson's ratio is provided. The system according to the present disclosure may monitor the temperature of any portion (surface or interior) of structure without external power supply, and obtain temperature data with timeliness and accuracy while ensuring the integrity and representativeness of temperature data, thereby realizing the accurate and efficient self-monitoring of structural temperature. The innovation of present disclosure is that the system is environment adaptive and may be self-powered. In the above system, the triboelectric nanogenerators are attached to the surface of chiral structured shape memory polymer microporous plate and tray bracket, respectively. During a temperature change, mechanical energy generated by the lateral contraction or expansion deformation of chiral structured shape memory polymer microporous plate is converted into electrical energy and stored in a capacitor. Based on the lateral sliding mode theoretical model of triboelectric nanogenerators, the deformation size is inversely deduced from the obtained voltage data, and then substituted into a deformation-temperature theoretical calculation model of chiral structured shape memory polymer microporous plate with a specific size and thickness to obtain a temperature value. According to the output voltage values of different portions of structure, the real-time temperature values of different parts can be obtained.

BRIEF DESCRIPTION OF DRAWINGS

FIG. 1 is a structural schematic diagram of a structural temperature self-monitoring system;

Reference signs: fixing apparatus 1; chiral structured microporous plate 2; triboelectric nanogenerators 3; tray 101; bracket 102; vacuum sucker 103; air value 104; vent cylinder 105; soft sucker 106; hexagonal cell 201; chiral leg 202; electrode 301 fixed at the bracket 102; electrode 302 fixed at the chiral structured microporous plate 2; voltage measuring device 303.

DESCRIPTION OF EMBODIMENTS

The specific embodiments according to the present disclosure is further described below in detail with the drawings.

As shown in FIG. 1, the present disclosure provides a structural temperature self-monitoring system based on the chiral structured shape memory polymer microporous plate, including a fixing apparatus 1, a chiral structured microporous plate 2 and a triboelectric nanogenerators set 3.

The fixing apparatus 1 is provided with a tray 101, two brackets 102 and four vacuum suckers 103. Each vacuum sucker 103 is provided with an air value 104, a vent cylinder 105 and a soft sucker 106.

The fixation of fixing apparatus 1 is realized by the vacuum sucker 103 located at the lower part of tray 101. The air is isolated through the air valve 104, and the fixation at any portion of structure is realized through atmospheric pressure. The soft sucker 106 is arranged at the lower part of vacuum sucker 103, which may be sucked at a monitored structure part after being vacuumed. The vent cylinder 105 is arranged above the soft sucker 106 and is configured to connect the soft sucker 106 to the air valve 104. The air valve 104 is located at the right side of vent cylinder 105 as a control switch of port for air.

Each chiral element of chiral structured microporous plate 2 is provided with one hexagonal cell 201 and six chiral legs 202. The adjacent chiral elements are connected to each other through the chiral legs 202. The deformation of chiral structured microporous plate 2 occurs during a temperature change.

The chiral structured microporous plate 2 is fixed at the fixing apparatus 1, and the triboelectric nanogenerators set 3 includes two slidable triboelectric nanogenerators symmetrically distributed to collect deformation data of chiral structured microporous plate 2 in converse directions. Two electronics of the nanogenerators move relative to each other to emerge a voltage for measurement.

The chiral structured microporous plate 2 has the properties of negative Poisson's ratio of a chiral structure, and shape memory effect of a shape memory polymer material, so that the chiral structured microporous plate 2 show a specific deformation under specific fixing conditions and environments.

The deformation of chiral structured microporous plate 2 fixed at both ends with a certain thickness only includes lateral contraction or expansion during the temperature change. The unidirectional deformation facilitates the triboelectric nanogenerators 3 to convert mechanical energy generated by the deformation into electrical signals for output.

The chiral structured microporous plate 2 takes the hexagonal cell 201 as the main body, and each main body is provided with six chiral legs 202. When the lateral deformation occurs, the deformation and rotation angle of hexagonal cells 201 may be ignored, and the lateral deformation may only be regarded as the elongation or shortening of chiral legs.

The adopted triboelectric nanogenerators 3 work in lateral sliding mode. The deformation and rotation angle of hexagonal cells 201 in the overall deformation process may be ignored, and the axial deformation of chiral structured microporous plate 2 may be regarded as the elongation or shortening of the chiral legs. The unidirectional deformation is suitable for constructing a voltage-displacement relationship of triboelectric nanogenerators 3 in the simple sliding mode, so as to realize a one-to-one conversion from deformation to electrical signals.

The triboelectric nanogenerators set 3 include two slidable triboelectric nanogenerators symmetrically placed, respectively, configured to collect deformation data of two opposite directions during the lateral deformation and obtain more accurate data by taking averaging values thereof.

One electronic 301 of triboelectric nanogenerators 3 is fixed at the bracket 102, and the other electronic 302 of triboelectric nanogenerators 3 is fixed at the chiral structured microporous plate 2. The electrode 302 moves with the chiral structured microporous plate 2 and slides relative to the electrode 301 fixed at the bracket 102 during the temperature change to emerge a voltage.

The system is powered by the triboelectric nanogenerators 3, and is almost not limited by environmental conditions, so that the system may be self-powered during normal operation, thereby realizing structural temperature self-monitoring.

FIG. 1 is a structural schematic diagram of a structural temperature self-monitoring system. An initial temperature is the temperature when there is no lateral deformation or electrical signal, or there is no relative displacement between the two electronics of triboelectric nanogenerators 3. The device is fixed to a certain portion of structure by the fixing apparatus 1 based on the vacuum sucker 103. Due to the change of temperature, a lateral deformation of chiral structured microporous plate 2 occurs, and the electronic 302 of triboelectric nanogenerators 3 is driven to slide relative to the other one. Through constructing relationship between the temperature and deformation, as well as the relationship between the relative slip of slidable triboelectric nanogenerators 3 and voltage, real-time temperature data can be obtained through the electrical signals received by the voltage measuring device 303, thereby realizing efficient and accurate structural temperature self-monitoring.

Finally, it is worthwhile to point out that the above embodiments are only used to illustrate the technical solutions according to the present disclosure, not to limit it. Although the present disclosure has been described in detail with reference to the above-mentioned embodiments, those skilled in the art should understand that the technical solutions recorded in the above-mentioned embodiments may still be amended, or some or all of technical features thereof may be replaced equivalently. However, the amendments or replacements do not make the essence of corresponding technical solutions separate from the scope of technical solutions according to the embodiments of present disclosure.

What is claimed is:

1. A structural temperature self-monitoring system based on a chiral structured shape memory polymer microporous plate, comprising a fixing apparatus (1), a chiral structured microporous plate (2) and a triboelectric nanogenerators set (3);

wherein each chiral element of chiral structured microporous plate (2) is provided with one hexagonal cell (201) and six chiral legs (202), adjacent chiral elements are connected to each other through the chiral legs (202), and deformation of chiral structured microporous plate (2) occurs during a temperature change; and wherein the chiral structured microporous plate (2) is fixed at the fixing apparatus (1), and the triboelectric nanogenerators set (3) comprises two slidable tribo-electric nanogenerators symmetrically distributed to collect deformation data of the chiral structured microporous plate (2) in converse directions, one electronic of the nanogenerators is fixed at a bracket (102) of fixing apparatus (1), the other electronic of the nanogenerators is fixed at and moves with the chiral structured microporous plate (2), and two electronics of the nanogenerators move relative to each other to emerge a voltage for measurement during the temperature change.

2. The structural temperature self-monitoring system based on a chiral structured shape memory polymer microporous plate according to claim 1, wherein the fixing apparatus (1) is provided with a tray (101), two brackets (102) and four vacuum suckers (103), and each vacuum sucker (103) is provided with an air value (104), a vent cylinder (105) and a soft sucker (106); and wherein the soft sucker (106) is located at a lower part of vacuum sucker (103) capable of being sucked at a monitored structural part after being vacuumed, the vent cylinder (105) is provided above the soft sucker (106) and is configured to connect the soft sucker (106) to the air valve (104), and the air valve (104) is provided at a right side of vent cylinder (105) as a control switch of port for air.

3. The structural temperature self-monitoring system based on a chiral structured shape memory polymer microporous plate according to claim 2, wherein two ends of chiral structured microporous plate (2) with a certain thickness are fixed at the tray (101), and the deformation during the temperature change comprises contraction or expansion in an unfixed direction.

4. The structural temperature self-monitoring system based on a chiral structured shape memory polymer microporous plate according to claim 2, wherein a first electrode (301) of the triboelectric nanogenerators (3) is fixed at the bracket (102), a second electrode (302) of the triboelectric nanogenerators (3) is fixed at the chiral structured microporous plate (2), and the second electrode (302) moves with the chiral structured microporous plate (2) and slides relative to the first electrode (301) fixed at the bracket during the temperature change to emerge a voltage measured by a voltage measuring device (303).

5. The structural temperature self-monitoring system based on a chiral structured shape memory polymer microporous plate according to claim 1, wherein the triboelectric nanogenerators (3) work in lateral sliding mode, and an axial deformation of chiral structured microporous plate (2) comprises elongation or shortening of chiral legs (202).

6. The structural temperature self-monitoring system based on a chiral structured shape memory polymer microporous plate according to claim 1, wherein the chiral structured microporous plate (2) has negative Poisson's ratio of a chiral structure, and shape memory effect of a shape memory polymer material.

\* \* \* \* \*